No. 742,502. PATENTED OCT. 27, 1903.
M. SCHROEDER.
PROCESS OF MAKING SULFURIC ANHYDRID AND SULFURIC ACID BY THE CONTACT PROCESS.
APPLICATION FILED APR. 21, 1900.
NO MODEL.
3 SHEETS—SHEET 1.
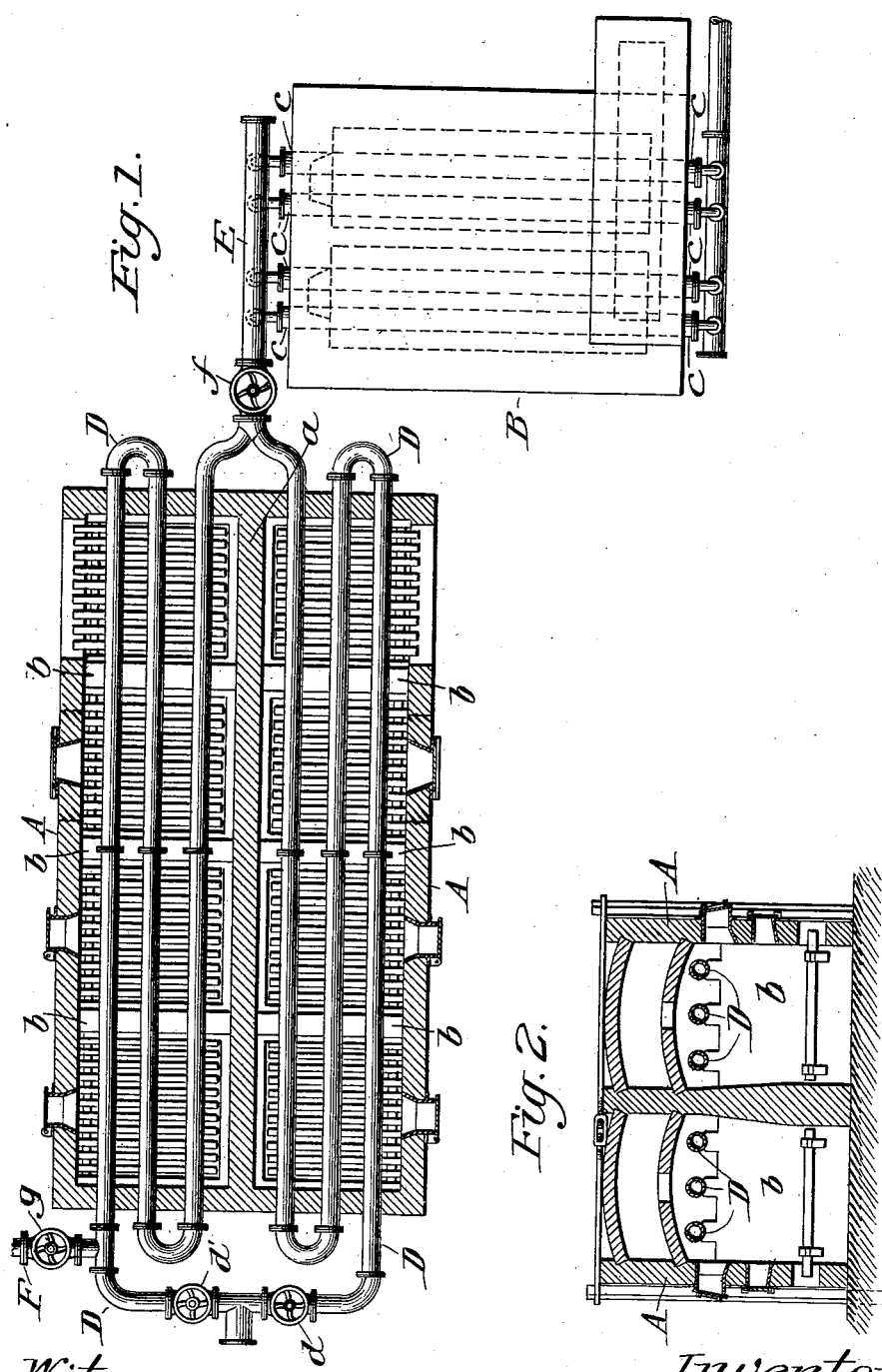

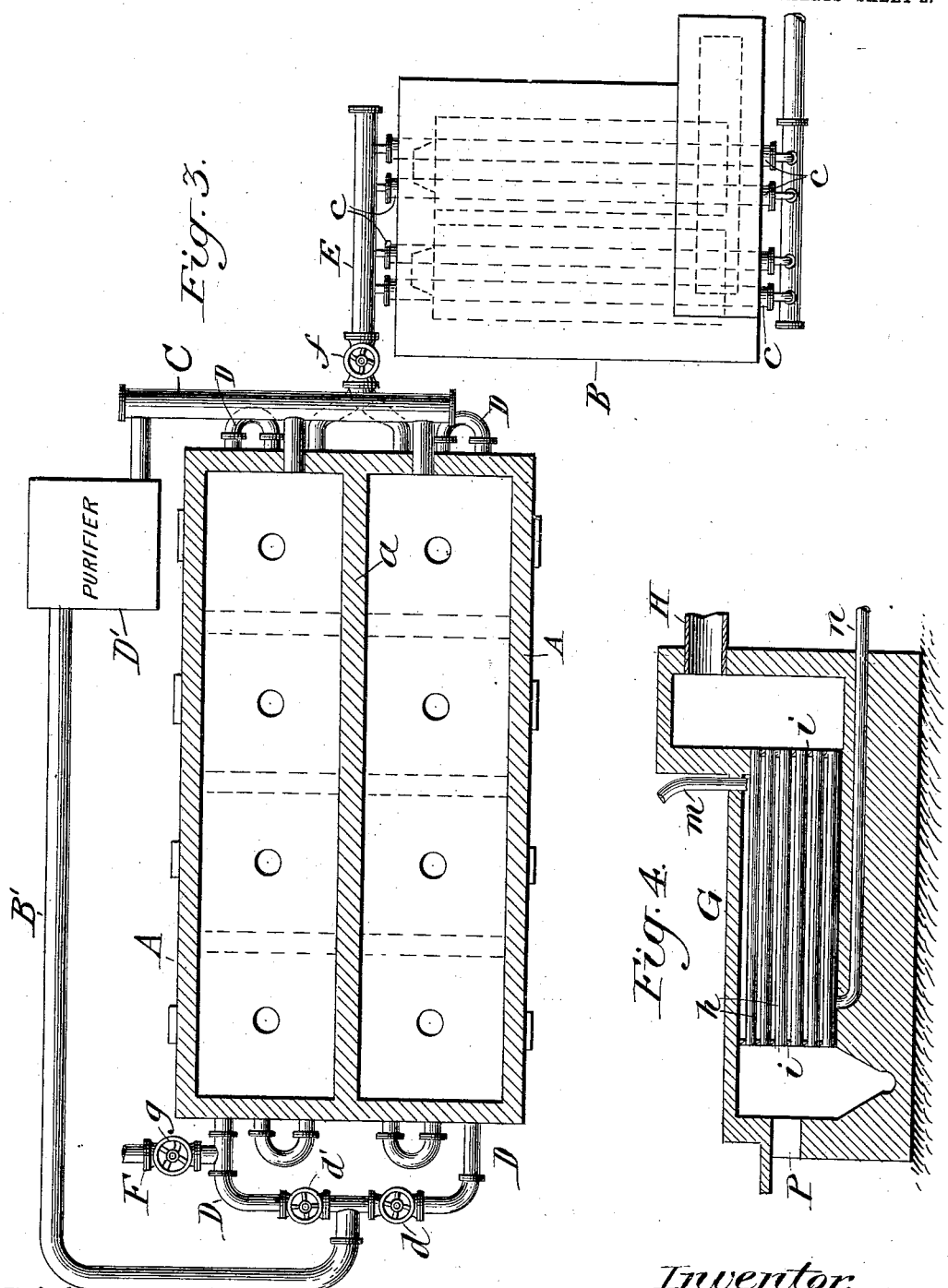

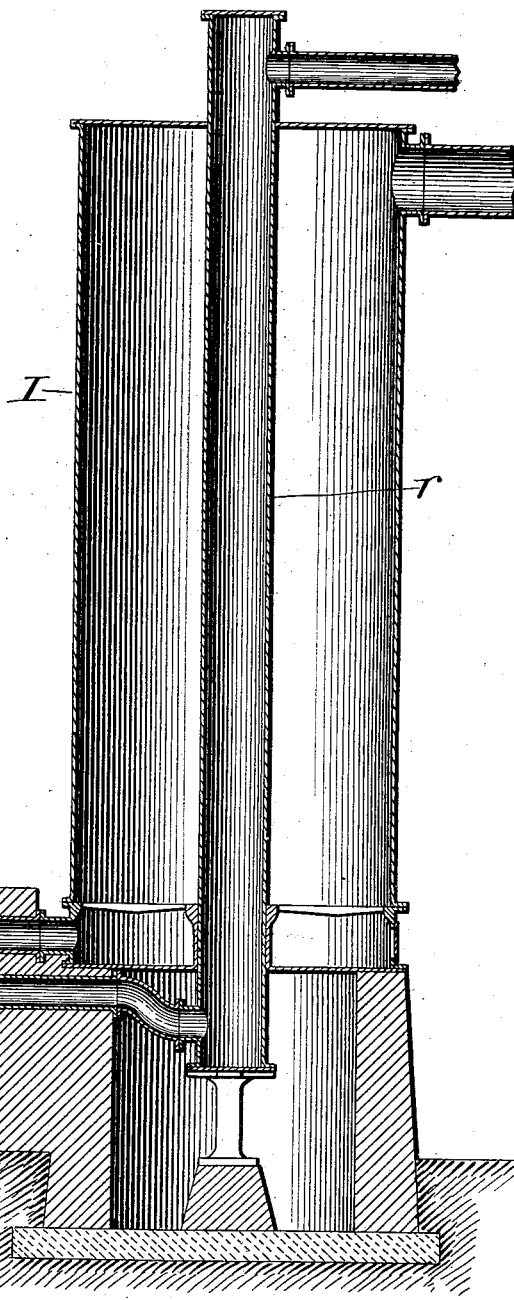

No. 742,502.

Patented October 27, 1903.

UNITED STATES PATENT OFFICE.

MAX SCHROEDER, OF HAMBORN, GERMANY, ASSIGNOR TO THE NEW JERSEY ZINC COMPANY, OF NEW YORK, N. Y., A CORPORATION OF NEW JERSEY.

PROCESS OF MAKING SULFURIC ANHYDRID AND SULFURIC ACID BY THE CONTACT PROCESS.

SPECIFICATION forming part of Letters Patent No. 742,502, dated October 27, 1903.

Application filed April 21, 1900. Serial No. 13,794. (No specimens.)

*To all whom it may concern:*

Be it known that I, MAX SCHROEDER, a German subject, residing at Hamborn, Rhineland, Germany, have invented certain new and useful Improvements in Processes of Making Sulfuric Anhydrid and Sulfuric Acid by the Contact Process; and I do hereby declare the following to be a full, clear, and exact description of the invention, such as will enable others skilled in the art to which it appertains to make and use the same.

In the production of sulfuric acid and sulfuric anhydrid by the so-called "contact" process, wherein the furnace-gases containing the sulfurous anhydrid and oxygen to be united pass through a body of catalytic material, the heat of said gases, which would be of great economical importance in the general operation, has heretofore been lost, for the reason that in order to purify the furnace-gases sufficiently to justify their admission into the retorts containing platinized catalytic material it is customary to first pass them through a condenser or purifier, wherein they are deprived of the foreign substances whose deposition upon and within the platinized material would otherwise interrupt or seriously interfere with the catalytic action of the platinized material, requiring its frequent removal and the substitution of new or regenerated material. Moreover, not only is the heat of the furnace-gases lost in the purifying step referred to, but the purified gases must be reheated to the high temperature essential for the satisfactory progress of the catalytic action in the retorts containing the platinized material, and consequently a further loss is occasioned by reason of the fuel required for such reheating.

The purpose of my invention is not only to save and utilize for the contact process the heat of the furnace-gases, but also to avoid the expenditure of fuel which would otherwise be necessary to restore them to the temperature with which they should enter the retort containing the catalytic material. To this end after the purification of the furnace-gases and their consequent cooling I conduct them before their entrance into the retorts containing the catalytic material through conduits exposed to the action of the hot unpurified furnace-gases on their way to the purifier. The otherwise waste heat of the unpurified furnace-gases is transferred to the current of purified furnace-gases, thereby bringing the latter to an appropriate temperature for admission to the retorts containing the catalytic material. Furthermore, the lessened temperature of the unpurified furnace-gases due to this interchange is usually advantageous to the purifying operation itself, inasmuch as the necessity for employing supplemental cooling agents to maintain the temperature of the purifier at a sufficiently low point is correspondingly diminished.

In carrying out my invention I may avail myself of various forms of apparatus having the same underlying or fundamental mode of operation. In the accompanying drawings I have illustrated several typical forms of such apparatus, as will more fully hereinafter appear, all of which may be advantageously used in the practice of the process.

In the drawings, Figure 1 represents a plan view, partly in section, of one form of apparatus for the practice of the invention. Fig. 2 represents a cross-sectional view thereof, taken on a plane indicated by the line 2 2 of Fig. 1. Fig. 3 represents a cross-sectional view taken on a higher plane than Fig. 2 and showing the return connections from the sulfur-burning furnace or kiln to the purifier and from the purifier to the reheating-conduits. Fig. 4 represents in vertical section another typical form or modification of such apparatus, and Fig. 5 represents a vertical section of still another form or modification thereof.

Similar letters of reference indicate similar parts throughout the several views.

In the apparatus illustrated in Figs. 1, 2, and 3 is shown a double row of furnaces A for the roasting of lump pyrites, which furnaces have a common rear wall *a*. The individual furnaces are provided with transverse walls *b*, which extend upwardly almost to the roof-arch. These transverse walls *b* may conveniently serve for supporting the conduits conveying the purified gases to the retorts containing the catalytic material, which retorts are indicated at c, Fig. 1, and which are contained within a suitable furnace B. The conduits referred to may conveniently consist of iron pipes or tubes D, which in the present case are arranged parallel to the dividing-wall and longitudinally of the double bench of furnaces. The cooled gases from the main C' enter the purifier D' and in their cooled condition pass into the pipe B', from which they are forced or drawn by a blower or exhauster in appropriate quantity, regulable by the valves d d', into and through the two branches of the conduit D. This subdivision of the current of purified gas is desirable, for the reason that at certain stages of the firing of the furnaces the one side or the other of the furnace-bench may be the hotter, according to the prevailing stages of the furnace operation in the individual furnaces. In order to maintain as uniform a condition of temperature as possible for both rows of furnaces, and thus avoid the necessity for too radical a subdivision of the gas flow through the two branches of the conduit D, I recommend that the charging operation be so conducted that in each series alternate ovens shall be freshly charged at the time when their proximate neighbors of the series are in full blast. In passing through the conduit branches D the purified gases take up and absorb the heat of the unpurified furnace-gases which envelop the conduits, and the purified gases then issue into a tube or conduit E, having a jacket of asbestos or other heat-insulating material, and pass thence direct into the retorts c, containing the platinized catalytic material. The contact apparatus should be arranged in as close proximity to the pyrites-furnaces as is practicable in order to lessen as far as possible any loss of heat in transit, and in some instances, if need be, the structure B, containing the retorts c, may be provided with means for heating the retorts externally, so as to furnish any additional increment of temperature that may be found of advantage to the catalytic action. In some instances I may dispense with the furnace structure B and its retorts c and insert the platinized catalytic material in one branch of the conduit D. In that case the purified furnace-gases would pass through the other branch of the conduit—for instance, the branch proximate to the observer in Figs. 1 and 3—and would then after the preliminary heating due to such passage enter the second branch and, passing through said second branch, would issue therefrom through a continuation indicated by the letter F, Figs. 1 and 3. This arrangement would have the advantage that the retorts or tubes containing the contact material would be themselves heated by direct contact with the gases of the pyrites-furnaces. I have illustrated in Figs. 1 and 3 additional valves f g, whose appropriate manipulation will permit the plant therein illustrated to be used in accordance with this last-mentioned procedure.

In the modification shown in Fig. 4 the unpurified hot furnace-gases from the pyrites or sulfur furnaces are illustrated as passing from the flue P into and through a series of tubes h in manner similar to the fire-tubes of a locomotive-boiler, said fire-tubes being carried by end plates i, forming, with the walls of the structure G, an inclosed space, into which leads the inlet-pipe m, conveying under pressure the purified gases from the purifier. An exit-pipe n conveys the purified gases after they have been reheated by contact with the exterior walls of the tubes h to the retorts containing the catalytic material, while the unpurified furnace-gases after giving up the corresponding quantity of heat to the purified gases pass on through the flue H to the purifier.

In the apparatus illustrated in Fig. 5 the unpurified furnace-gases from the pyrites or sulfur furnaces pass upwardly through the vertical shaft I on their way to the purifier and give up their heat to the purified furnace-gases, which, entering under pressure through the pipe p, pass into the vertical conduit r, from which in a highly-heated condition they proceed to the retorts or other apparatus containing the catalytic material. The shaft I may, if desired, contain a loose filling of fire-brick or like heat-storing material, and a supplemental furnace S may also be provided to supply any required further increment of heat.

I am of course aware that it is not broadly new to utilize the heat of gases issuing from furnaces of various kinds. In fact, in the recovery of sulfuric acid by the lead-chamber process it is not uncommon to utilize the heat of combustion of the sulfur ores or sulfur in various ways—for instance, for the production of the nitrogeneous vapors in the so-called "saltpeter-furnace," and, furthermore, for the concentration of the more dilute sulfuric acid—and in some instances concentrating-pans have been arranged directly over the roasting-furnaces or the gas-exit flue in order to thereby utilize as far as is possible by such an expedient the heat of the furnace-gases. It will be readily understood, however, that in none of these instances is even the same problem presented which is solved by my present invention and which is peculiar to the practice of the catalytic process—to wit, the reheating of the furnace-gases themselves to a temperature appropriate for their introduction into the retorts containing the catalytic material and after they have been necessarily cooled in order to sufficiently purify them for advantageous use in the presence of platinized catalytic material.

Having thus described my invention, what I claim is—

The method of recovering sulfuric anhydrid and sulfuric acid, which consists in producing furnace-gases containing sulfurous anhydrid and oxygen, purifying said gases from foreign materials that would otherwise deposit upon the catalytic material, reheating, by the hot furnace-gases, the gases incidentally cooled during the purifying operation, and passing the reheated gases into contact with catalytic material; substantially as described.

In testimony whereof I affix my signature in presence of two witnesses.

MAX SCHROEDER.

Witnesses:
H. A. J. WILKENS,
T. LEWIS THOMAS.